United States Patent [19]

Ostertag

[11] Patent Number: 4,820,343

[45] Date of Patent: Apr. 11, 1989

[54] PROCESS FOR TRANSFERRING METAL IONS USING MICROPOROUS MEMBRANES

[75] Inventor: Karl Ostertag, Erlenbach am Mein, Fed. Rep. of Germany

[73] Assignee: AKZO N.V., Netherlands

[21] Appl. No.: 736,077

[22] Filed: May 20, 1985

[30] Foreign Application Priority Data

May 21, 1984 [DE] Fed. Rep. of Germany ....... 3418825
Mar. 21, 1985 [DE] Fed. Rep. of Germany ....... 3510187

[51] Int. Cl.[4] ............................................. C22B 15/08
[52] U.S. Cl. .................. 75/101 BE; 75/117; 210/648; 210/649; 210/805; 210/806; 423/24; 423/DIG. 14
[58] Field of Search ......................... 423/24, DIG. 14; 210/648, 649, 805, 806; 75/101 BE, 117

[56] References Cited

U.S. PATENT DOCUMENTS

| | | |
|---|---|---|
| 3,244,763 | 12/1960 | Cahn . |
| 3,939,203 | 2/1976 | Mattison et al. . |
| 3,956,112 | 5/1976 | Lee et al. ............................ 210/644 |
| 3,957,504 | 5/1976 | Ho et al. . |
| 4,051,230 | 9/1977 | Miyauchi ............................ 210/648 |
| 4,125,461 | 11/1978 | Li . |
| 4,247,498 | 1/1981 | Castro . |
| 4,551,252 | 11/1985 | Boyadjiev . |

FOREIGN PATENT DOCUMENTS

2910793 2/1980 Fed. Rep. of Germany .

OTHER PUBLICATIONS

Murray et al, E/MJ, Jul. 1973, pp. 74–77.
Journal of Membrane Science, R. W. Baker, 2 (1977) pp. 213–233.
Journal of Membrane Science, J. D. Lamb, 9 (1981) pp. 83–107.
Chemical Engineering, H. J. McGarr, Aug. 10, 1970, pp. 82–84.
Journal of Membrane Science, 21 (1984) pp. 5–19.

Primary Examiner—Melvyn J. Andrews
Attorney, Agent, or Firm—Parkhurst, Oliff & Berridge

[57] ABSTRACT

The invention relates to a process for transferring metal ions from an aqueous liquid to a non-aqueous liquid and then to another aqueous liquid. The non-aqueous liquid contains one or more complexing agents and is kept separate from the aqueous liquid releasing metal ions by one or more microporous hydrophobic membrane(s). The non-aqueous liquid is circulated through two or more transfer zones in which the metal ions are taken up and released. The metal ions are released from the non-aqueous liquid into the second aqueous liquid by mechanical mixing of the two phases, followed by a mechanical separation process. The flow of metal ions obtained by this low-cost process is higher than in other processes. The process facilitates coupled co- and counter transport and may be used with advantage, inter alia, in the dressing of ores and in effluent treatment.

22 Claims, 1 Drawing Sheet

PROCESS FOR TRANSFERRING METAL IONS USING MICROPOROUS MEMBRANES

BACKGROUND OF THE INVENTION

This invention relates to a process for transferring metal ions from an aqueous liquid A to a non-aqueous liquid B and from non-aqueous liquid B to an aqueous liquid Z, B taking up the metal ions from A in a first transfer zone and carrying them to a second transfer zone in which it releases the metal ions to Z. Liquid B is immiscible or substantially immiscible with the liquids A and Z, contains at least one complexing agent for the metal ions and is a solvent for the metal ion complexes. Liquid B is continuously circulated through the transfer zones, liquid A being kept separate from the circulated liquid B by one or more microporous hydrophobic membranes of which the pores contain some of the total quantity of liquid B.

Processes in which metal ions have to be removed from an aqueous solution are used, for example, in the dressing of ores. In this case, it is frequently desirable selectively to transfer ions of a certain type from an aqueous liquid and to recover the metal in pure form therefrom. Another field of application for processes of this type is effluent treatment where metals have to be removed substantially completely from aqueous liquids.

Processes for transferring metal ions from one aqueous solution to another with complexing in between are already known. Thus, German Offenlegungsschrift No. 29 10 793 describes a process in which an organic liquid containing a complexing agent is accommodated in the pores of a membrane. One surface of the membrane is in contact with the aqueous liquid which releases metal ions, while the other surface is in contact with the aqueous liquid taking up the metal ions. Accordingly, the metal ions are transferred by complexing on one surface of the membrane, diffusion of the complexes through the pore system, and release of the ions at the other surface of the membrane. The disadvantage of processes of this type is that the complexing agent can escape from the pore system and penetrate into the aqueous liquids. This can be produced by a certain solubility of the complexing agent in water or by pressure variations or by turbulence in the aqueous liquids at the surfaces of the membrane. These losses of complexing agent result initially in a slowing down of the process, i.e. in a reduction in the flow of metal ions, and ultimately in the stoppage of the process. Before they can be reused, the membranes have to be cleaned and refilled.

In other processes, the problem discussed above is overcome by not using a complexing agent which remains stationary in the pores of the membrane. Instead, the organic liquid containing the complexing agent is transferred from a first transfer zone to a second transfer zone. In the first transfer zone, the metal ions are taken up from one aqueous liquid by the complexing agent and, in the second transfer zone, are released to another aqueous liquid. Processes of this type, which operate on the principle of extraction and segregation of liquid systems by separation, are described in Chemical Engineering 1970, pages 82 et seq. and in U.S. Pat. No. 3,939,203. These processes also have disadvantages. Thus, undesirable impurities can pass from the aqueous liquid releasing metal ions into the organic liquid while the two liquids are being intensively mixed. These impurities then have to be removed by purifying operations before the pure metals are recovered.

U.S. Pat. No. 3,957,504 describes a process in which an organic phase, which contains a complexing agent and which may be circulated, takes up metal ions from an aqueous liquid and releases them to another aqueous liquid. In this process, the two aqueous liquids are kept separate from the organic phase by membranes. This process is attended by the disadvantage that the flow of metal ions, i.e. the quantity of metal ions transferred per unit of time from one aqueous liquid to the other, is limited due to the use of membranes both on the so-called "feed" side and on the "strip" side (on the "feed" side, the ions are transferred from the aqueous phase to the organic phase; on the "strip" side, they are transferred from the organic phase to the aqueous phase).

Accordingly, the object of developing the process according to the invention was to provide a process which does not have any of the disadvantages mentioned above and which, in particular, represents a more economical alternative to known processes.

SUMMARY OF THE INVENTION

According to the invention, this object is achieved by a process as described in the first paragraph of this Specification, characterized in that, in the second transfer zone, liquid B is mechanically mixed with liquid Z, aqueous phase is separated from this mixture by a mechanical separation process, and the remainder of the mixture is returned to the circuit.

DETAILED DESCRIPTION OF PREFERRED EMBODIMENTS OF THE INVENTION

Figure 1:
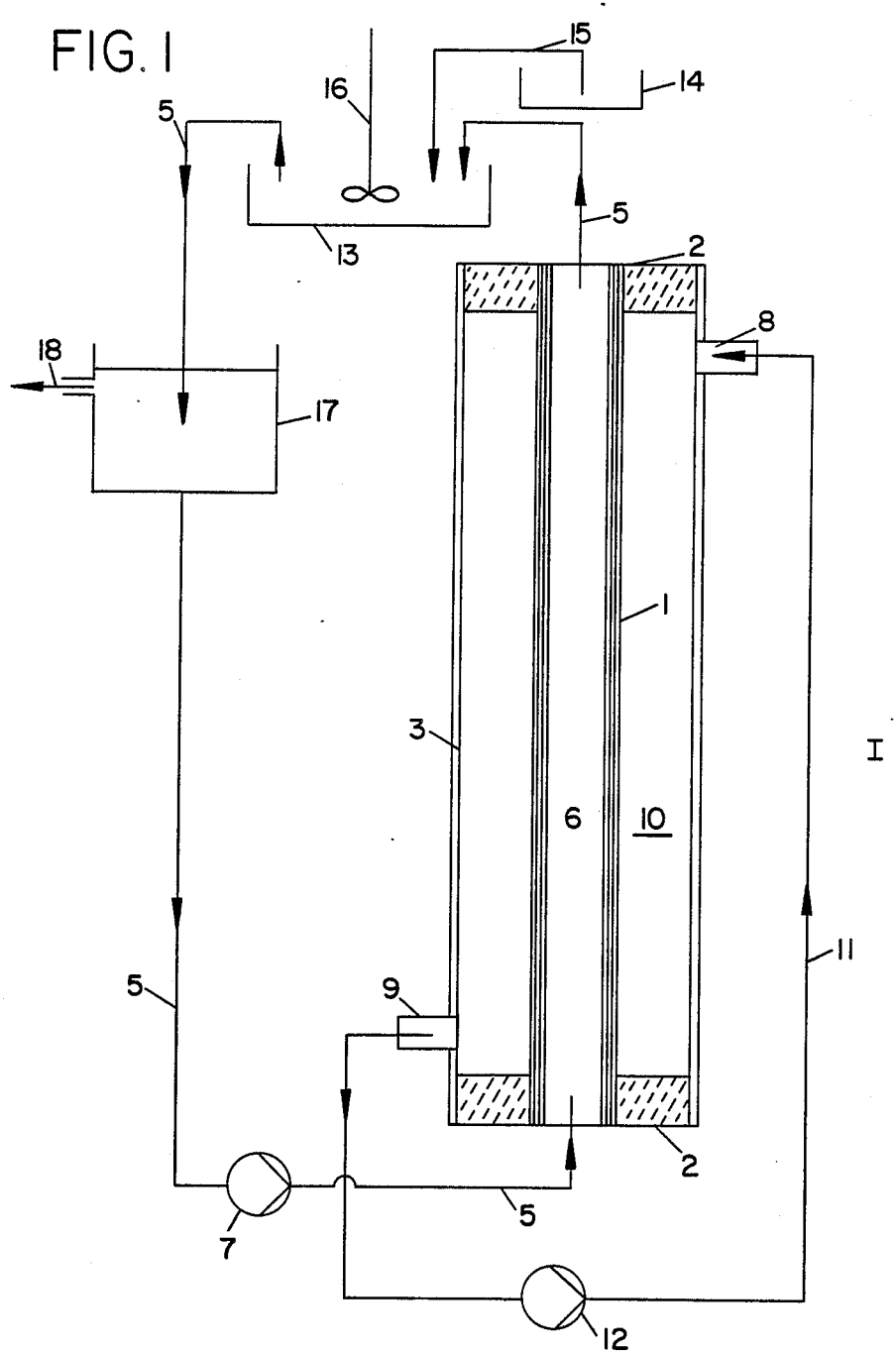
FIG. 1 is a simplified diagrammatic illustration of one embodiment of the process according to the invention.

In the first transfer zone, the aqueous liquid A, which contains the metal ions to be transferred, is in contact with one of the surfaces of one or more microporous hydrophobic membranes. A non-aqueous liquid B is guided along the other surface of the membrane(s) either in pure form or in admixture with a second aqueous phase, as will be explained in more detail hereinafter. In general, liquid B is an apolar or weakly polar organic liquid and contains at least one complexing agent for the metal ions. If several types of metal ions are to be transferred at the same time, liquid B may contain more than one complexing agent. Part of the total quantity of liquid B is situated in the pores of the hydrophobic membrane. Accordingly, the transfer of metal ions from liquid A to liquid B takes place at that surface of the membrane which faces liquid A. Under the effect of concentration gradients and the complexing equilibrium, the metal ions are complexed and transferred to liquid B. The complexes diffuse through the liquid B accommodated in the pores, again under the effect of concentration gradients. To ensure that this diffusion process takes place at an acceptable rate, B must be a solvent for the complexed metal ions. At the other surface of the membrane(s), the complexes, taken up by that part of liquid B which is circulated, are carried to a second transfer zone, in which the metal ions are released from their complexes and transferred to an aqueous liquid Z. The release of the metal ions from liquid B to liquid Z takes place in this zone, i.e. on the strip side, by mechanical mixing of B with Z. Since the liquids B and Z are immiscible with one another at rest, this mechanical mixing must incorporate thorough blending of the two phases, which may be achieved for example by a stirrer. Intensive stirring promotes mixing and increases the flow of metal ions from liquid B to liquid Z. After the mechanical mixing operation, aqueous phase is separated off from the mixture by a mechanical separation process.

The process according to the invention may be carried out continuously. While the use of membranes is imperative in the first transfer zone, no membranes are used in the second transfer zone, because liquid B does not contain any unwanted impurities. By contrast, liquid A may contain such impurities either in dissolved or in dispersed form. Because of their particle sizes and/or their polarity, impurities dispersed in A do not pass into liquid B present in the micropores of the membrane. Because of their polarity, impurities dissolved in liquid A do not penetrate into the pores of the hydrophobic membrane or into the apolar liquid B.

The mechanical mixing of the liquids B and Z may be carried out, for example, in a relatively large vessel using a high speed stirrer. The mechanical separation process, which follows the mechanical mixing step and by which aqueous phase is separated from the mixture again, makes use of the fact that the liquids B and Z are immiscible with one another at rest. Accordingly, the mixture obtained by mechanical mixing separates into the two phases on standing, so that aqueous phase may be separated off by a decanter or separator or by similar apparatus.

A "coalescence cartridge" may additionally be used if there has been some emulsification of one phase in the other. A "coalescence cartridge" is used for the fairly rapid coagulation of emulsified liquid and may comprise, for example, a metal tube filled with tightly packed polyester fibers through which the mixture of liquids B and Z is passed.

In addition, the mechanical mixing step and the mechanical separation process may optionally be carried out at a temperature other than room temperature, for example to accelerate phase separation.

The mechanical separation process may be carried out in such a way that non-aqueous phase and aqueous phase are completely separated and only the non-aqueous liquid B is returned to the first transfer zone. In one preferred embodiment of the process according to the invention, however, only part of the aqueous phase present in the mixture is separated off, so that a mixture of non-aqueous liquid (B) and aqueous liquid (Z) is returned to the circuit and carried back to the first transfer zone. This variant of incomplete separation has the advantage over the above-described process of complete separation that the necessary mechanical separation process is over more quickly. In addition, when the mixture coming from the first transfer zone is mixed with fresh liquid Z, less fresh liquid Z is required and the mixture operation is over more quickly. Less time is required in this case for mixing the mixture with fresh liquid Z because at least some of the metal ions entering the mixture in the first transfer zone have already been transferred to the aqueous phase of the mixture before mixing with fresh liquid Z. In overall terms, therefore, the process of incomplete separation is superior to the process of complete separation because it takes less time.

The process of incomplete separation may be carried out in several ways. Two possibilities are described hereunder:

(a) Only part of the circulating mixture of liquids B and Z (after passing the mixer) is subjected to the mechanical separation process and is completely separated into organic phase and aqueous phase, the organic phase being returned to the circuit. This variant is illustrated by Examples 2 to 4 below.

(b) The mixture is subjected as a whole to the separation process in which it is incompletely separated into a pure or substantially pure aqueous phase on the one hand and a mixture of organic and aqueous phase on the other hand. The mixture obtained after separation is returned to the circuit while the pure aqueous solution is removed as product solution.

The decision on variant (a) or variant (b) depends on the special parameters of the process to be carried out. Whereas variant (a) is universally workable, variant (b) may only be adopted if pure aqueous phase, but not organic phase, separates first from the mixture on standing. On the other hand, variant (b) may be superior to variant (a), namely when complete separation into two pure phases takes a long time.

Pure metal may be obtained from the ions in the aqueous phase which is obtained after the mechanical separation process and which differs from liquid Z in having a higher metal content and possibly also in the pH-value. In some cases, it is advantageous to subject the aqueous phase to purification before recovery of the metals. This purification step may be carried out, for example, by another mechanical separation process, for example to remove any remaining traces of the organic phase B from the aqueous phase.

The process according to the invention has the following advantages, inter alia, over known processes:

(a) The flow of metal ions on the strip side, i.e. the quantity of ions transferred per unit of time, is greater. This is a consequence of the mechanical mixing of the phases B and Z.

(b) The apparatus for carrying out the process is simple.

(c) A deactivation of the membranes on the feed side due to leaching out is prevented because liquid B can continuously enter the pores from the circuit and replace losses.

After liquid B or the mixture of liquids B and Z has left the second transfer zone, it may be directly returned to the first transfer zone to take up more metal ions. However, in a preferred embodiment there may be other transfer zones in the circuit of B, their number being an even number. In this way, liquid B may alternately take up metal ions from liquid A in one zone and release them to liquid Z in the following zone and vice versa. Accordingly, in this embodiment, liquid B is circulated through an even number of more than two transfer zones, and liquid B alternately takes up metal ions from liquid A in one transfer zone and vice versa.

In principle, the advantage obtainable in this way, namely an increased quantity of metal ions transferred per unit of time, may also be obtained to a certain extent where only two transfer zones are used, for example by increasing the size or by using a larger number of hollow filament membranes for transferring the metal ions from A to B. However, the use of more than two transfer zones affords the advantage that it is possible to use commercially available apparatus, whereas larger membranes may necessitate the use of specially produced apparatus. In addition, the dimensions or lengths of the membranes cannot be increased beyond a certain extent without weakening one of the advantages of the process, namely the high concentration gradients of the metal ions between the liquids A and B, because B enters the first transfer zone with a low concentration of metal ions which only increases along the membrane. Where apparatus of large dimensions are used, liquid B may become very heavily enriched with metal ions so that the flow values, i.e. the quantity of metal ions transferred per unit of time, may be lower because of falling concentration gradients than in cases where more than two exchange units of relatively small dimensions are used. This is because, in the latter case, liquid B releases the metal ions to liquid Z before it is recharged with ions. Where more than two transfer zones are used, every second transfer zone may be fed from a common reservoir of liquid A, whereas the quantities of metal-ion-enriched aqueous phase obtained in the other transfer zones may feed a common reservoir of an aqueous liquid. In this case, too, membranes keep liquid A separate from liquid B in the corresponding transfer zones in the manner already described.

In addition to the embodiments described above in which liquid B alternately takes up metal ions from liquid A and releases them to liquid Z, there is another embodiment in which the transfer zones are arranged in series. This embodiment is characterized for example in that, in several successive transfer zones, liquid B takes up metal ions from a liquid A before releasing them to liquid Z.

In order to obtain high concentration gradients between the liquids A and B, a preferred embodiment of the invention is characterized in that liquid A is circulated. Liquid A may in this case be passed in the same or in the opposite direction to the direction of flow of liquid B or of the mixture of liquids B and Z over the membrane surfaces. However, liquid A may also be stationary.

In order to maintain electrical neutrality in liquid A, anions for example may be transferred at the same time and in the same direction as the metal ions. Suitable for this variant are, for example, crown ethers of the type described in *Journal of Membrane Science*, 9 (1981), pages 83 et seq., because crown ethers can also entrain anions. However, the crown ethers are also suitable for the process of coupled co-transport described hereinafter. Their use represents a preferred embodiment of the process. In addition to the unsubstituted crown ethers, derivatives of the crown ethers, such as substituted crown ethers, are also suitable. The embodiment of the process in which cations and anions are simultaneously transferred from liquid A to liquid B and then to liquid Z is a so-called coupled co-transport. It may be used for recovery of metals from cations or anions such as chromate anions, for example in the dressing of chromium- and uranium-containing ores. In this case, where recovery of metals from anions is desired, the simultaneous transfer of cations only serves the purpose of maintaining electrical neutrality in the liquid A and the cations may be, for example, hydrogen ions.

The preferred complexing agent in liquid B is in this case again a compound selected from the group of the above-mentioned crown ethers.

If the process of coupled co-transport is carried out in such a way that the concentration gradient of the cations between liquid A and liquid Z is greater than the corresponding gradient of the anions, it is possible to transfer the anions even against their concentration gradient; that is, transfer of anions takes place even when their concentration in Z is greater than in A.

It is particularly preferred to maintain electrical neutrality in the aqueous liquids by carrying out so-called coupled counter-transport in which cations X, which are not identical with the metal ions, are transferred in the opposite direction. On the one hand, this process affords the advantage that it is even possible to use complexing agents which are unsuitable for transporting anions, but which are desirable, for example by virtue of their selectivity for certain metal ions. Particularly suitable complexing agents of this type are chelating hydroxy oximes of the type described in *Journal of Membrane Science*, 2 (1977), pages 213 et seq. Accordingly, another preferred embodiment of the process according to the invention is characterized in that chelating hydroxy oximes are used as complexing agents in the coupled counter-transport variant of the process. Other suitable complexing agents are organic phosphoric acid derivatives such as, for example, phosphoric acid di-(2-ethylhexyl)-ester, and organic phosphine oxides, for example trioctyl phosphine oxide.

In addition, coupled counter-transport processes have the major advantage that metal ions can be transferred against their concentration gradients. This means that metal ions can be transferred from liquid A via liquid B to liquid Z, even when the concentration of metal ions in Z is greater than in A. This is possible if the concentration gradient of the cations X is even greater and supplies the motive force. The process then continues to operate for as long as $X_Z/X_A$ is greater than $M_Z/M_A \exp n_X/n_M$, where $X_A$ and $X_Z$ are the concentrations of the cations X in the liquids A and Z, respectively, $M_A$ and $M_Z$ are the corresponding concentrations of the metal ions and $n_M$ and $n_X$ are the valencies of the metal ions and of the cations X, respectively. Hydrogen ions are preferably used as the cations X. The condition stipulated above then means that liquid Z must be more acidic than liquid A. In general, the pH-value of Z is from 0.5 to 1.5 and the pH-value of A is from 2.5 to 6. In order to maintain the above-mentioned condition over a prolonged period, it is advisable to maintain a substantially constant pH-value in liquid A by neutralization of the transferred hydrogen ions, for example by addition of a buffer.

Accordingly, another preferred embodiment of the process is characterized in that, coupled with the transfer of metal ions, cations X which are not identical with the metal ions are transferred in the opposite direction to the transfer of the metal ions, the cations X also being present in the form of dissolved complexes in liquid B. The cations X must be present as dissolved complexes in liquid B to ensure that they can be rapidly transferred from liquid Z to liquid A. Accordingly, the complexing agent(s) present in liquid B must also complex the cations X and B must be a solvent for the complexed cations X.

For the process of coupled counter-transport, it is further preferred for the concentration ($X_Z$) of X in Z to be greter than the concentration ($X_A$) of X in A and for $X_Z/X_A$ to be greater, at least at the beginning of the process, than $M_Z/M_A \exp n_X/n_M$ where $M_A$ and $M_Z$ are the concentrations of the metal ions in liquids A and Z, respectively, and $n_M$ and $n_X$ are the valencies of the metal ions and of the cations X, respectively.

In another preferred variant, $M_Z$ is greater than $M_A$.

Other preferred embodiments are characterized in that the cations X are hydrogen ions and in that, in that case, a substantially constant pH-value is maintained in liquid A by neutralization of the transferred hydrogen ions.

Microporous hydrophobic membranes are used for the process according to the invention.

Microporous membranes in the context of the invention are membranes which have average pore diameters of from about 0.05 μm to 10 μm. Their suitability for a given process is determined by the diameter at the narrowest point which a particle migrating from one surface of the membrane to the other has to pass.

Particularly suitable microporous membranes for the process according to the invention are those which have a so-called cellular pore system. In microporous membranes of this type, substantially spherical cells joined together by connecting pores are present in addition to the pores in the interior of the membrane. The cells may have average diameters of from about 0.5 μm to about 100 μm. The connecting passages which represent the pores determine whether a certain particle is still able to pass through the membrane and generally have average diameters of from about 0.05 μm to 10 μm. Accordingly, membranes of this structure are particularly suitable for the process according to the invention because they are able to take up the majority of available complexing agents into the pore system, but not impurities dispersed in liquid A in the form of relatively large particle aggregations.

Pore structures suitable for the process according to the invention are described inter alia in U.S. Pat. No. 4,247,498. The corresponding disclosures in that document are incorporated herein by reference.

In these membrane structures, it is possible by virtue, inter alia, of the presence of the cells to establish large pore volumes, i.e. pore volumes of from 65 to 85% of the total volume of the membrane. Relatively large pore volumes, i.e. the volumes of the cells and connecting pores together, enable a larger quantity of liquid B to be accommodated in the pore system and thus lead to a larger quantity of metal ions diffusing through the membrane per unit of time. In one preferred embodiment of the process according to the invention, therefore, the pore volume of the membranes makes up from 65 to 85% of their total volume. In a still further preferred embodiment, the pore volume makes up from 70 to 80% of the total volume.

So far as the practicability of the process is concerned, the membranes used may have virtually any wall thickness. It is only at the narrower end of the range that there are limits imposed by the stability requirements which the membrane has to satisfy. Since the liquids used exert certain pressures on the membrane, stability considerations can impose a lower limit on the wall thickness of membranes where the pores occupy large volumes. Since, on the other hand, relatively thick walls lead to longer diffusion paths for the metal ion complexes, it is best not to use excessive wall thicknesses. In one preferred embodiment of the process according to the invention, therefore, the wall thickness of the membranes is from about 50 μm to about 400 μm. In a still further embodiment, the wall thickness is from about 50 μm to 300 μm.

The membranes used for the process according to the invention are hydrophobic. This means that the inner surface of the membranes which is formed by the surfaces of the cells and pores together must be hydrophobic. This may be achieved either by using a hydrophobic material for the entire membrane or by using membranes of a material which is not in itself hydrophobic, but of which the inner surface has been hydrophobized. This may be the case, for example, where a hydrophobizing coating is present. On the one hand, the hydrophobicity of the membrane material ensures that the apolar or very weakly polar, water-immiscible or substantially water-immiscible liquid B readily penetrates into the membrane pores, because hydrophobic membranes are readily wetted by apolar liquids. On the other hand, the hydrophobicity of the membrane material prevents the penetration of water and of the liquids A and Z, because aqueous liquids show much higher liquid entry pressures with respect to those materials than apolar organic liquids. The liquid entry pressure is the minimum pressure which a liquid must have to be able to penetrate into the pore system of a membrane. For water and hydrophobic polypropylene, the liquid entry pressure is of the order of 2.5 to 3 bar when the pores have a diameter of approximately 0.4 μm at their narrowest cross-section. The following method is used to determine the liquid entry pressure: A hollow filament having a wall thickness of approximately 100 to 200 μm is produced from the membrane material to be examined. The pore structure of the hollow filament should largely coincide with that of the membrane subsequently to be used. The lumen of the cleaned and dried hollow filament is filled with the liquid to be studied, of which the pressure is then slowly increased. The liquid entry pressure is the pressure at which the first drop of liquid emerges from the outer surface of the hollow filament which may readily be visually determined. Since, in the process according to the invention, the aqueous liquids show pressures below the liquid entry pressures which they have with respect to the hydrophobic materials, water and any polar impurities dissolved therein are prevented from penetrating. Only the metal ions passing into solution through complexing in liquid B are able to penetrate into the pore system.

Hydrophobic membranes which are suitable for the process according to the invention include, for example, polyolefins or halogenated polyolefins. Membranes of polypropylene, such as for example Accurel ® (a product of Enka AG, Wupertal, Germany), have proven to be particularly suitable. The use of membranes of polypropylene is a preferred embodiment of the process according to the invention. Membranes of polyvinylidene fluoride may also be used with advantage. The hydrophobicity of the membranes alone would not be sufficient to prevent water or polar impurities dissolved in water from penetrating into the membrane if such penetration were to occur through mixing with liquid B. For this reason, B must be immiscible or substantially immiscible with the liquids A and Z. This means that the solubility of B in A and in Z and the solubility of A and of Z in B should not be any greater than about 0.5 to 1 g/l.

Microporous hydrophobic materials, for example in the form of flat or spiral membranes, may be used for the membranes. However, membranes in the form of hollow filaments or tubes have proved to be particularly suitable because they have large surfaces for a relatively low volume. In a preferred embodiment of the process, therefore, hollow filaments or tubes are used as the membranes. Another preferred embodiment of the process according to the invention is characterized in that the hollow filaments or tubes are vertically arranged and the non-aqueous liquid B or the mixture of liquids B and Z is guided downwards over the surfaces of the hollow filaments or tubes. In this connection, B or the mixture of B and Z may be guided along the outside of the membranes or through their lumina. By virtue of the downward flow, any fall in the pressure of liquid B along the hollow filaments or tubes is completely or partly compensated by the hydrostatic pressure. This compensation of the drop in pressure which would otherwise occur regularizes the transport of metal ions over the entire length of the membrane.

Liquid B may comprise one or more complexing agents without any further additives. However, in a preferred embodiment B is a solution of one or more complexing agent(s) in an apolar solvent or solvent mixture. Since the rate of diffusion of the metal ion complexes in the pore system depends upon the viscosity of liquid B, it is frequently of advantage to add a low-viscosity solvent.

A simplified diagrammatic illustration of one embodiment of the process according to the invention is given in FIG. 1. In the interest of simplicity, only one hollow filament 1 is shown for the first transfer zone which is denoted by the reference I. At its upper and lower ends, the hollow filament is joined by a housing 3 by an encapsulating compound 2. The liquid B or the mixture of liquids B and Z follows the path indicated by the line 5 in a pipe system and flows through the lumen 6 of the hollow filament. Accommodated in the liquid pipe 5 is a pump 7 which circulates liquid B. The housing 3 has an inlet and outlet for liquid respectively denoted by the references 8 and 9. In the housing 3, which is situated in the transfer zone I, the aqueous liquid A is accommodated in the chamber 10. Liquid A can be circulated through the liquid inlet and outlet along the path indicated by the line 11 in the opposite direction to liquid B. Pump 12 may be provided for this purpose. A relatively large reservoir (not shown) for liquid A may be present along the path 11. The transfer of metal ions from A to B takes place on that surface of the hollow filament membrane 1 facing the chamber 10. Heating jackets (not shown) may be arranged both on the housing 3 and on the liquid pipes.

After leaving the lumen 6, liquid B or the mixture of liquids B and Z enters a mixing unit 13 into which liquid Z is introduced from a reservoir 14 via the pipe 15. Liquid B is mechanically mixed with liquid Z by means of a stirrer 16. After leaving the mixing unit, the mixture is delivered to a unit 17 comprising a decanter, separator or the like in which the mechanical separation process is carried out. After aqueous phase has been separated from the mixture, it is delivered through pipe 18 to a further pocessing stage, while the remaining components of the mixture are returned to the circuit via the pipe 5.

The point at which aqueous phase to be separated is removed from the unit 17 is situated in the upper or lower part of the unit 17, depending on the specific gravities of the aqueous phase to be separated and the components to be circulated (pure phase B or a mixture of aqueous and organic phase). Before it is returned to the first transfer zone, the mixture of aqueous and organic phase leaving the unit 17 may pass once again through the mixing unit 13 or another mixing unit in which it is subjected to intensive mechanical mixing.

A coalescence cartridge (not shown) of the type described above may be provided between the mixing unit 13 and the separation unit 17, promoting the coagulation of any emulsified constituents and thus accelerating separation in the unit 17.

The process according to the invention is further illustrated by the following Examples, which are presented for purposes of illustration only and are not to be considered as limiting the scope of protection defined by the appended claims.

COMPARATIVE EXAMPLE 1

In this Comparative Example, metal ions were transferred (from liquid B to liquid Z) by means of membranes on the strip side, i.e. in the second transfer zone, as well as in the first transfer zone. Accordingly, liquids B and Z were not directly mixed, instead liquid B was kept separate from liquid Z by microporous hydrophobic membranes, of the type also used in the first transfer zone to keep liquid A separate from liquid B.

The two membrane arrangements each consisted of 800 hollow filaments of microporous cellular polypropylene having a maximum pore diameter of 0.57 $\mu$m (diameter at the narrowest point of the pores). The pore volume accounted for 78% of the total volume of the hollow filaments. The hollow filaments had a wall thickness of 150 $\mu$m, an internal diameter of 300 $\mu$m and a length of 216 mm, so that each hollow filament arrangement had a total inner surface area of approximately 0.16 m².

The aqueous liquids A and Z flowed downwards through the lumina of the vertically arranged hollow filaments of the first and second membrane arrangements. The organic liquid B containing the complexing agent was delivered from the outer space around the hollow filaments of the first arrangement to the outer space around the hollow filaments of the second arrangement and back again, flowing upwards over the outer surfaces of the hollow filaments. The liquids A and B were each circulated at a rate of approximately 250 l/h and liquid Z at a rate of approximately 400 l/h. Liquid A had a total volume of 6 l, liquid B a total volume of 5.3 l and liquid Z a total volume of 7 l.

Liquid A was a solution of $CuSO_4$ in FD-water. The pH-value was initially adjusted to 3.5 with sulfuric acid and was kept at around 3.5 during the process by the addition of aqueous NaOH. The initial concentration of $Cu^{2+}$ ions was 2286 ppm.

At the beginning of the process, liquid Z was a solution of sulfuric acid in water and was free from Cu ions. Its pH-value at the beginning of the process was 0.4.

Liquid B consisted of a 10% by weight solution of LIX ® 63/70 in kerosene and, at the beginning of the process, was free from Cu.

After a running time of about 4 hours, the content of $Cu^{2+}$ ions in liquid A had fallen to 610 ppm. After 21 hours, a Cu content of 1428 ppm was determined in liquid Z.

The flow of Cu ions between A and B amounted to 26.2 $\mu$g/cm²/min (mean value over the first 4 hours of running time). The flow of Cu ions between B and Z amounted to 5.1 $\mu$g/cm²·min (mean value over the period from about 4 hours to 24 hours after start up).

It is assumed that the difference in the flow values between the feed side (first transfer zone) and the strip side (second transfer zone) is attributable to the velocities of the corresponding chemical reactions (complexing and release of the metal ions from the complexes). Accordingly, continuous working of the process under the conditions mentioned here gives a total flow of the metal ions of approximately 5.1 $\mu$g/cm²·min. This value may well change after longer running times than were used here.

INVENTION EXAMPLE 2

The above-described process of incomplete separation was applied, i.e. a mixture of non-aqueous liquid B and aqueous liquid Z was circulated.

In the first transfer zone, the aqueous liquid A was kept separate form the mixture of B and Z by hollow filament membranes. The hollow filament membranes were the same as in Comparative Example 1. As explained above, only liquid B was present in the pores of the membranes, not a mixture of B and Z.

After the mixture of B and Z had left the first transfer zone, fresh liquid Z was introduced into the circuit of this mixture. The mixture enriched with fresh liquid Z was mechanically mixed in a stirring vessel. The stirring vessel comprised an approximately 1.5 liter capacity glass vessel provided with a level governor. An anchor stirrer was used for mechanical mixing. After mechanical mixing, part of the mixture was removed from the mixing vessel while the rest of the mixture remained in circulation.

The removed part of the mixture passed first through a coalescence cartridge comprising tightly packed polyester fibers with a volume of approximately 50 cm$^3$. Thereafter, this part of the mixture was delivered to a gravity separator which had a volume of 300 cm$^3$ and a height of 20 cm. In this gravity separator, the mixture was completely separated into organic phase and aqueous phase. The organic phase was returned to the circuit. The aqueous phase enriched with metal ions was run off as product solution.

The process was carried out in such a way that the total volume of the circulating mixture of aqueous and organic phase remained constant. Accordingly, the volume of fresh liquid Z delivered to the circuit per unit of time was on average as great as the volume of aqueous liquid removed in the separation unit. Volume was monitored by a level governor in the stirring vessel.

Liquid A was an aqueous $CuSO_4$ solution containing sulfuric acid of which the pH-value of 3.5 was kept constant during the process by the addition of aqueous NaOH. A volume of 6.6 l of liquid A was circulated at 250 l/h. The Cu content of the circulating liquid A was kept constant at 160 ppm. This was done by continuously removing part of the liquid A from the circuit and continuously introducing a $CuSO_4$ solution containing 2000 ppm of Cu, the volumes removed and introduced per unit of time being the same, namely about 880 cm$^3$/h so that the circulating quantity of A was constant at approximately 6.6 l.

The circulating mixture of liquids B and Z had a volume of 6.6 l and consisted of 10% by volume of aqueous sulfuric acid and 90% by volume of a 10% by weight solution of LIX ® 63/70 in kerosene. The mixture had a pH of 0.64 and a Cu content of 13,000 ppm. The quantity and composition of the circulating mixture was kept constant by the above described separation of part of the aqueous phase and corresponding introduction of fresh liquid Z into the circuit. The freshly introduced liquid Z was a 3% aqueous $H_2SO_4$ having a pH-value of 0.55. It was introduced at a rate of 100 cm$^3$/h.

Under these conditions, the flow of Cu amounted to 15.7 $\mu g/cm^2 \cdot min$ (based on the total area of the hollow filament membrane of the first transfer zone).

Despite the fact that the Cu ions were transferred against a very high concentration gradient (160 ppm against 13,000 ppm), a flow higher by a factor of 3–4 than in Example 1 was thus obtained.

INVENTION EXAMPLE 3

The procedure was as in Example 2, but with the following differences:

The quantity of fresh liquid A introduced into the circuit of A had a Cu content of 2200 ppm and was introduced at a rate of 875 cm$^3$/h.

The circulated mixture of B and Z contained 35% by volume of aqueous $H_2SO_4$ and 65% by volume of a 10% by weight solution of LIX ® 63/70 in kerosene.

The circulated mixture had a Cu content of 8100 ppm and a pH-value of 0.53.

The fresh liquid Z was introduced at a rate of 168 cm$^3$/h.

A Cu flow of 17 $\mu g/cm^2 \cdot min$ was obtained.

INVENTION EXAMPLE 4

The procedure was as in Example 3, but with the following differences:

The freshly introduced liquid A contained 1800 ppm of Cu and was introduced at a rate of 1155 cm$^3$/h.

The circulating liquid A contained 560 ppm of Cu.

The circulating mixture of aqueous and organic phase contained 16,500 ppm of Cu and had a pH-value of 1.1.

The freshly introduced liquid Z had a pH value of 0.69 and was introduced at a rate of approximately 100 cm$^3$/h.

A Cu flow of 16.3 $\mu g/cm^2 \cdot min$ was obtained.

The LIX ® 63/70 used as complexing agent is a mixture of two hydroxy oximes obtainable from Henkel Corp., Kankakee, Ill., USA.

I claim:

1. A process for the recovery of metal ions, comprising:

providing at least one first transfer zone in which a first aqueous liquid containing said metal ions is separated from a non-aqueous liquid,
  said non-aqueous liquid being substantially immiscible with said first aqueous liquid, containing at least one complexing agent for said metal ions, and being a solvent for complexes of said metal ions and said complexing agent, and
  said first transfer zone comprising at least one microporous hydrophobic membrane having pores which contain a portion of said non-aqueous liquid;
  said first aqueous liquid being separated from said non-aqueous liquid in said first transfer zone by said at least one microporous hydrophobic membrane;

circulating said non-aqueous liquid from said first transfer zone to at least one second transfer zone;

mechanically mixing said non-aqueous liquid with a second aqueous liquid which is substantially immiscible with said non-aqueous liquid to form a mixture, and subsequently mechanically separating at least part of a resulting aqueous liquid from said mixture in said second transfer zone;

removing said at least part of said resulting aqueous liquid; and circulating the remainder of said mixture containing said non-aqueous liquid from said second transfer zone back to said first transfer zone;

whereby said non-aqueous liquid takes up said metal ions from said first aqueous liquid in said first transfer zone, carries said metal ions to said second transfer zone, and releases said metal ions to said second aqueous liquid in said second transfer zone.

2. A process as claimed in claim 1, wherein said non-aqueous liquid is circulated through an even number of said transfer zones greater than two, said non-aqueous liquid alternately taking up metal ions from said first aqueous liquid in said first transfer zone and releasing them to said second aqueous liquid in said second transfer zone and vice versa through said even number of transfer zones.

3. A process as claimed in claim 1, wherein only part of the aqueous phase present in the mixture is separated off in the mechanical separation process.

4. A process as claimed in claim 1, wherein a transfer of cations which are not identical with said metal ions is carried out in the opposite direction to the transfer of said metal ions, said cations also being present in the form of dissolved complexes in said non-aqueous liquid.

5. A process as claimed in claim 4, wherein a concentration ($X_Z$) of said cation in said second aqueous liquid is greater than a concentration ($X_A$) of said cation in said first aqueous liquid, and wherein, at least at the beginning of the process, $X_Z/X_A$ is greater than $M_Z/M_A$ exp $n_X/n_M$, $M_A$ and $M_Z$ being the concentration of said metal ions in said first and second aqueous liquids, respectively, and $n_M$ and $n_X$ being the valencies of said metal ions and of said cations, respectively.

6. A process as claimed in claim 5, wherein $M_Z$ is greater than $M_A$.

7. A process as claimed in claim 4, wherein said cations are hydrogen ions.

8. A process as claimed in claim 7, wherein a substantially constant pH-value is maintained in said first aqueous liquid by neutralization of said hydrogen ions.

9. A process as claimed in claim 1, wherein said first aqueous liquid is circulated.

10. A process as claimed in claim 1, wherein said at least one microporous hydrophobic membrane is comprised of hollow filaments of tubes.

11. A process as claimed in claim 10, wherein said hollow filaments or tubes are vertically arranged and said non-aqueous liquid flows downwards over their surfaces.

12. A process as claimed in claim 1, wherein said at least one microporous hydrophobic membrane comprises a cellular pore system comprising cells and connecting pores between said cells.

13. A process as claimed in claim 12, wherein the pore volume of said at least one microporous hydrophobic membrane makes up from 65% to 85% of its total volume.

14. A process as claimed in claim 12, wherein the pore volume of said at least one microporous hydrophobic membrane makes up from 70 to 80% of its total volume.

15. A process as claimed in claim 1, wherein said at least one microporous hydrophobic membrane has a wall thickness of from about 50 to 400 μm.

16. A process as claimed in claim 1, wherein said at least one microporous hydrophobic membrane has a wall thickness of from about 50 to 300 μm.

17. A process as claimed in claim 1, wherein said at least one microporous hydrophobic membrane comprises polypropylene.

18. A process as claimed in claim 1, wherein said at least one microporous hydrophobic membrane comprises polyvinylidene fluoride.

19. A process as claimed in claim 1, wherein said non-aqueous liquid is a solution comprising at least one complexing agents in an apolar solvent or solvent mixture.

20. A process as claimed in claim 1, wherein said complexing agent comprises crown ethers.

21. A process as claimed in claim 1, wherein said complexing agent comprises a chelating hydroxy oxime.

22. A process as claimed in claim 1, wherein said resulting aqueous liquid obtained from said mechanical separation is subjected to purification.

* * * * *